United States Patent
Sainz Mayoral et al.

(10) Patent No.: US 6,300,014 B1
(45) Date of Patent: *Oct. 9, 2001

(54) POSITIVE ELECTRODE AND SPECIAL LEAD ACCUMULATOR FOR USE AT HIGH TEMPERATURE

(75) Inventors: Maria José Sainz Mayoral; Francisco Trinidad Lopez, both of Alcala de Henares; Maria Luisa Soria Garcia-Ramos, Madrid, all of (ES)

(73) Assignee: Sociedad Espanola Del Acumulador Tudor, S.A., Madrid (ES)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,093
(22) Filed: Mar. 13, 1998
(51) Int. Cl.[7] ............... H01M 4/68; H01M 4/56; H01M 4/80
(52) U.S. Cl. ............ 429/245; 429/225; 429/226; 429/233; 429/234; 429/237; 429/218.1; 429/220
(58) Field of Search ............... 429/218.1, 220, 429/225, 226, 233, 234, 237, 245

(56) References Cited

U.S. PATENT DOCUMENTS

| | | | |
|---|---|---|---|
| 3,912,537 | 10/1975 | Peters | 136/26 |
| 3,990,893 | 11/1976 | Nijhawan et al. | 75/166 |
| 3,993,480 | * 11/1976 | Ueberschaer et al. | 75/766 |
| 4,107,407 | * 8/1978 | Koch | 429/255 |
| 4,159,908 | 7/1979 | Rao et al. | 75/167 |
| 4,456,579 | * 6/1984 | Rao et al. | 420/566 |
| 5,508,125 | 4/1996 | Bantz | 429/160 |
| 5,558,960 | * 9/1996 | Mitchell | 429/205 |
| 5,593,797 | * 1/1997 | Brecht | 429/210 |

FOREIGN PATENT DOCUMENTS

| | | | |
|---|---|---|---|
| 0506323A1 | 2/1992 | (EP) | |
| 2010905A | 12/1978 | (GB) | |
| 2010905 A | * 7/1979 | (GB) | C22C/11/10 |
| 2197342 A | * 1/1988 | (GB) | C22C/11/06 |
| 2197342A | 5/1988 | (GB) | |
| 61164332 | 11/1986 | (JP) | |
| 63019768 | * 1/1988 | (JP) | H01M/4/68 |

* cited by examiner

Primary Examiner—Gabrielle Bruillette
Assistant Examiner—Angela J. Martin
(74) Attorney, Agent, or Firm—Darby & Darby

(57) ABSTRACT

Positive electrode and special lead accumulator for use at high temperatures, which is provided with a holder based on a special lead alloy with improved behavior against corrosion, The alloy comprises from 1 to 5% of antimony, from 0.5 to 3% of tin, from 0.05 to 0.50% of arsenic, from 0 to 0.05% of copper and from 0 to 0.02% of bismuth.

10 Claims, 3 Drawing Sheets

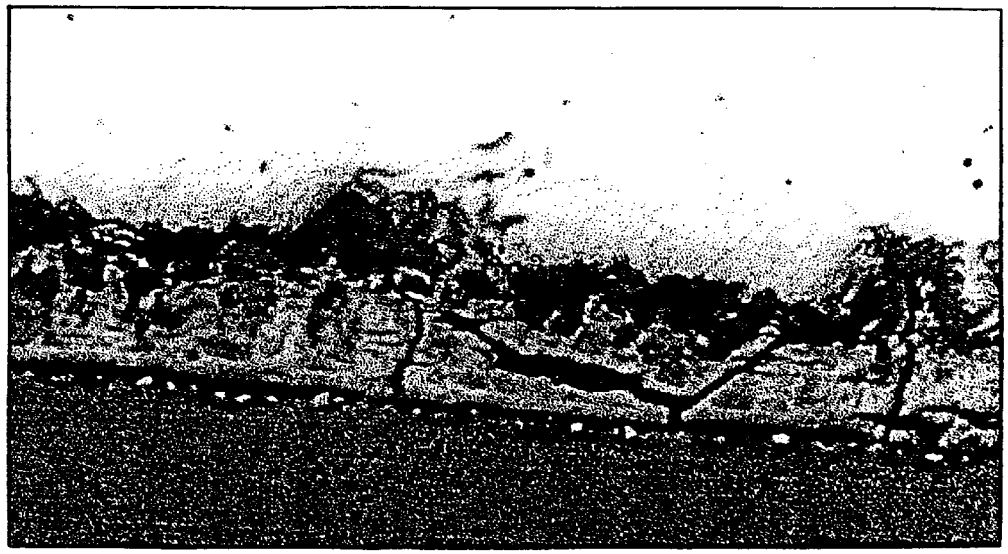
FIG. 2a  LOW TIN (X105)
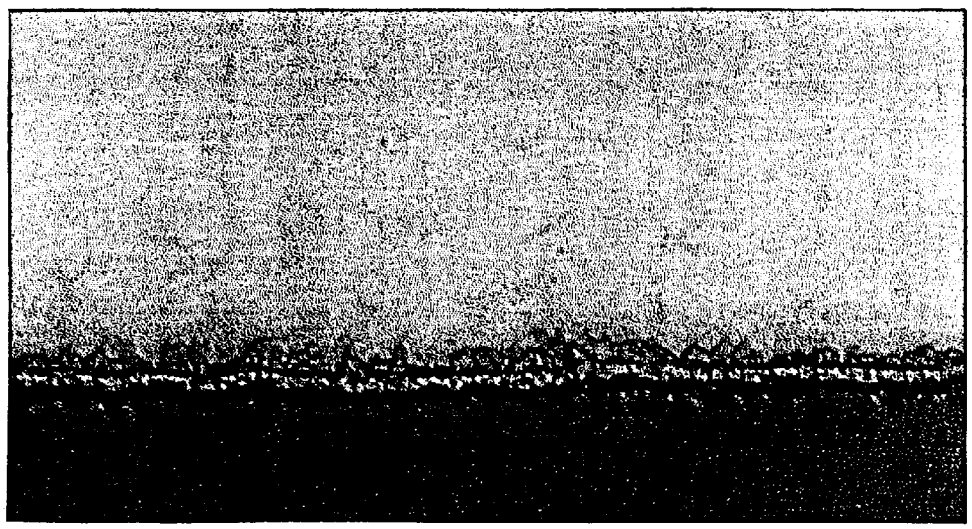
FIG. 2b  HIGH TIN (X105)

FIG. 3a          LOW TIN (X105)
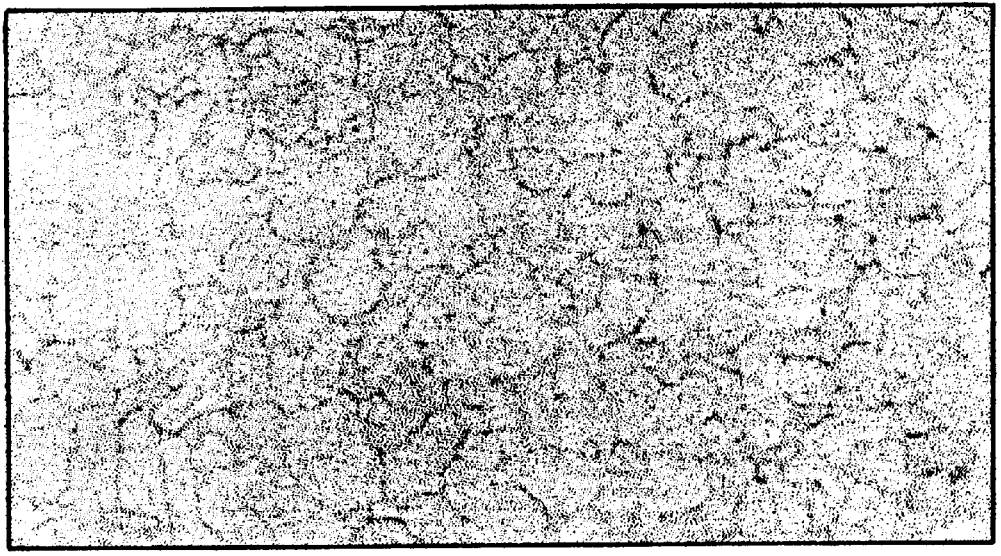
FIG. 3b          HIGH TIN (X105)

POSITIVE ELECTRODE AND SPECIAL LEAD ACCUMULATOR FOR USE AT HIGH TEMPERATURE

BACKGROUND OF THE INVENTION

This invention relates to a new lead-antimonytin-arsenic alloy for use in the production of grids employed as holders of the positive electrodes in electric accumulators, preferably lead-acid accumulators.

The electric accumulators which include positive electrodes, provided as holders of the grids constituted by the new alloy in compliance with the invention, has an improved behaviour against corrosion at high temperatures.

At present, electric accumulators are required for use in motorcars with special cycling characteristics, corrosion strength and improved behaviour at high environmental temperatures. The same may be said of the batteries used for storage of power and photovoltaic applications.

As is known, lead accumulators are made up of lead dioxide anodes and sponge lead cathodes, said electrodes having been prepared as from holders or grids of equal or different alloys and with different lead sulphate compositions included into the active material. These electrodes are physically separated by a separator of a different type of material (cellulosic, plastic, glass fibre, . . . ) the purpose of which is to provide a passage of conductor ions from one electrode to another, without any physical contact with each other.

Lead alloys are described in different patents for use in batteries, with corrosion strength properties. Thus, U.S. Pat. No. 5,339,873, describes the inclusion of titanium in order to improve the corrosion strength, or of tellurium in WIPO Publication No. WO90/09462. Other European and American patents describe the use of grids of different lead alloys with the addition of silver or strontium and a low tin content (EP 0506323 A1; U.S. Pat. No. 5,298,350; U.S. Pat. No. 5,434,025; U.S. Pat. No. 4,137,378 as improved alloys for lead-acid batteries. Similarly, U.S. Pat. No. 3,078,161 mentions an alloy made up of lead-tin with silver and cobalt, free from antimony.

SUMMARY OF THE INVENTION

The studies carried out by the applicant body on high temperature resistant power accumulators have given rise to a type of alloy with good service during cycling of up to 80° C., preferably in the interval of 20 and 80° C. and more preferably between 40–80° C. This is obtained according to the invention with antimony and tin alloyed lead grids, which are preferably used in positive plates of the lead-acid accumulators.

Consequently, according to a first aspect, the present invention provides electrodes, preferably positive, produced by means of a continuous or discontinuous process, and provided as holder, of a grid based on a lead-antimony-tin-arsenic alloy, which may also be obtained by means of a continuous expansion process, in the form of metallic strips obtained by casting.

According to a second aspect, the present invention offers a new lead-antimony alloy with a high tin content, for grids produced in a continuous or discontinuous manner to be used in positive electrodes of electric accumulators, the alloy of which is corrosion inhibiting and is provided with an optimum arsenic, copper and bismuth content so as to improve the mechanical properties.

According to a third aspect, the present invention provides a lead-acid accumulator battery provided with positive electrodes such as those previously indicated, which may be used under cycling conditions both at high and at low temperatures. Said battery, according to the invention, due to its use in facilities which may be exposed to high temperatures, may involve or not, a sealed battery, which presents a low water consumption, without requiring that this consumption be zero, but which, since it is very low, makes the accumulator not require any water to be added throughout all its service life.

In compliance with this invention, the inclusion of a high tin content to the alloy of the supports of the positive electrodes, is more beneficial versus the possible coating with corrosion inhibiting alloys, due to the fact that the manufacturing costs are not increased by new processes. Additionally, the behaviour against corrosion in sulphuric acid of the new alloy according to the invention is greatly improved, in comparison to the alloy with a low tin content.

Specifically, the present invention provides a new lead alloy as grid to be used as support of the positive electrode in a lead-acid accumulator battery, characterized in that it comprises as alloy components with the lead;

from 1 to 5%, preferably from 1 to 3% and in particular from 1.2 to 2% of antimony;

from 0.5 to 3%, preferably from 0.5 to 1.5% and in particular from 0.9 to 1.3% of tin;

from 0.05 to 0.50%, preferably from 0.10 to 0.25% of arsenic.

from 0 to 0.0500%, preferably from 0.0100% to 0.0300% of copper; and from 0 to 0.0200%, preferably from 0.0050% to 0.0100% of bismuth.

BRIEF DESCRIPTION OF THE DRAWINGS

The characteristics and advantages of the invention shall be herewith made clear in the following non limitative examples, considered in combination with the enclosed drawings, in which:

FIGS. 2a and 2b respectively show the characteristics of the layers of corrosion observed in the low and high tin content alloys.

FIG. 3a and 3b respectively illustrate, the metallographies of both alloys.

DETAILED DESCRIPTION OF THE PREFERRED EMBODIMENTS

EXAMPLE 1

Figure 1:
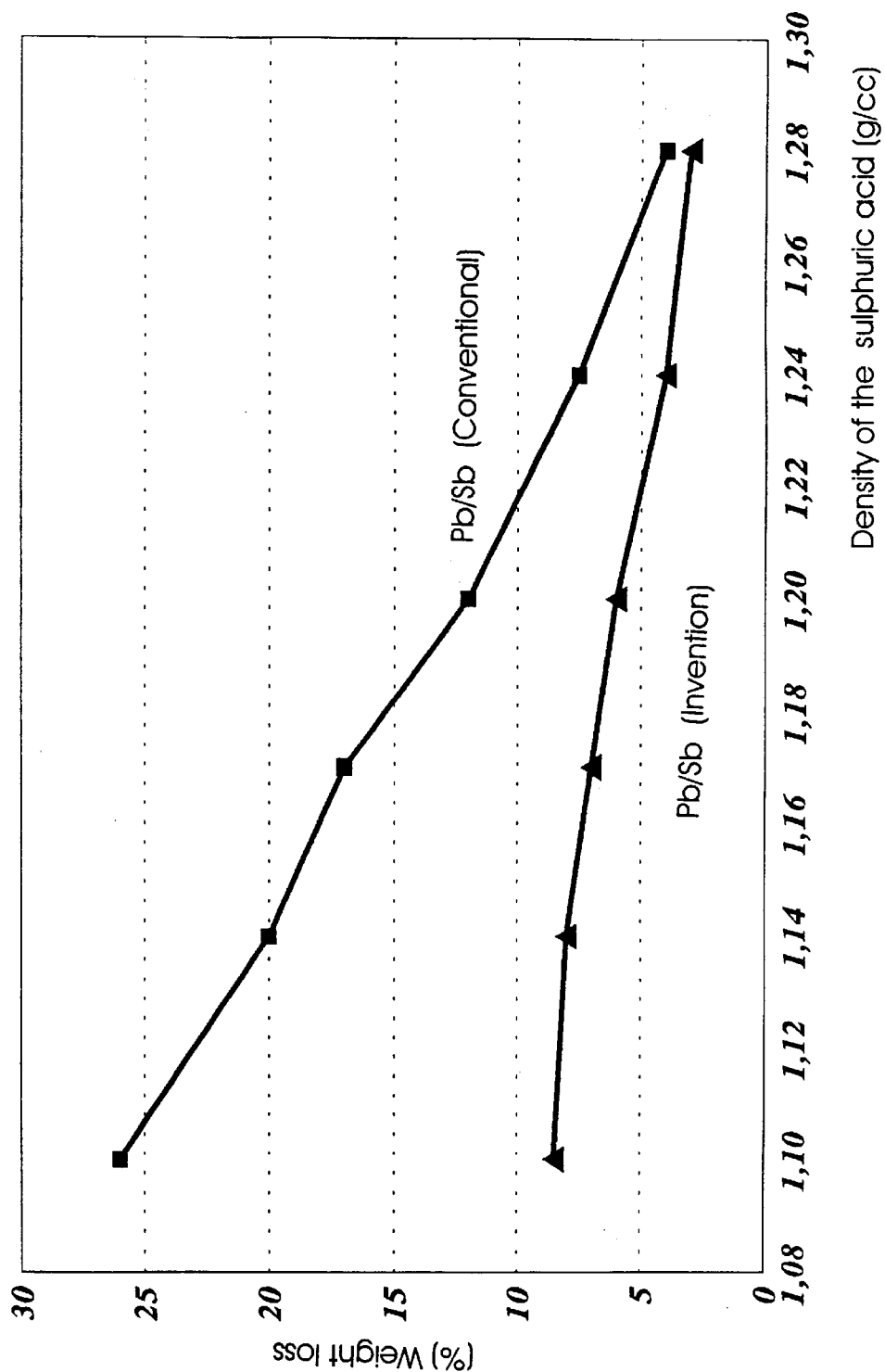
FIG. 1 is a graph which illustrates the behaviour against corrosion, for lead-antimony grids with a low tin content (aside from the invention) in comparison with the lead-antimony grids with a high tin content (according to the invention).

A lead-antimony alloy is prepared, according to the components defined in this invention, parting from which, holder grids are produced by means of continuous or discontinuous processes, and which shall be subjected to corrosion tests as subsequently indicated.

The corrosion test consists of the introduction of the holder grids, produced by means of continuous or discontinuous casting, in sulphuric acid of different densities (1.10; 1.7; 1.20; 1.24 and 1.28 g/cm$^3$) and subjecting them to equilibrium potentials corresponding to the positive plate. In this test, loss of weight is observed due to maximum corrosion of 26% for the low tin content grids and of 8% for the tin enriched alloy (FIG. 1).

The characteristics of the maximum corrosion layers observed in the low tin content alloys and high content, which is the object of this invention, are compared in FIG. 2 (2a, 2b). The thicknesses of the corrosion layers observed, have been of 120±10μ and 40+2μ respectively. The metallographies of both alloys are observed in FIG. 3.

The explanation of this superior behaviour in the grids with a high tin content resides in the beneficial effect of this element, on the absence of isolation layers in the formation of corrosion products. In consequence, the presence of tin, decreases the quantity of the alpha PbO present, which favours the reaction of the transformation of the same in PbOx (1<x<1.5), the electrical conductivity of this compound being over that of the PbO and favouring, in consequence, the electrical conductivity and the absence of a greater quantity of isolating oxides. This is due to the presence of the $Sn^{3+}$ion in the crystal lattice of the alpha PbO, with which the electrical conductivity of the formed compounds is improved.

EXAMPLE 2

An alloy is prepared according to the components defined in the invention, manufactured by the continuous expansion procedure of the positive electrodes according to this invention. These are prepared in the following manner:

The holders with the alloy composition of this invention, are pasted with a mixture of lead sulphates obtained by means of a reaction under agitation of lead oxide-sulphuric acid and water. Batteries with said electrode are assembled, filled with electolyte, charged and electrically tested in cycling at high temperatures (Standard SAE J537 for application to lead-acid accumulators). After the test, the batteries are broken down and the corrosion layers which have formed are observed and measured. The results obtained are summarized as follows:

|  | SAE 40° C. | SAE 75° C. |
|---|---|---|
| No. of units | 12 | 5 |
| Corrosion layer (μ) | 100 ± 20 | 125 ± 20 |
| Corrosion per unit (μ/unit) | 8 | 25 |
| Grid growth | very low | very low |

What is claimed is:

1. An electrode for a lead-acid accumulator battery comprising a grid including a lead alloy which, as alloy components with the lead, consists of:

from 1% to 5% of antimony;

from 0.9% to 3% of tin;

from 0.05% to 0.5% of arsenic;

from 0.01% to 0.03% of copper; and from 0 to 0.02% of bismuth.

2. The electrode according to claim 1, wherein the lead alloy, as alloy components with the lead, consists of:

from 1 to 3% of antimony;

from 0.9 to 1.3% of tin;

from 0.10 to 0.25% of arsenic;

from 0.0100% to 0.0300% of copper; and from 0.005% to 0.0150% of bismuth.

3. The electrode according to claim 1, characterized in that the electrode is used at temperatures cycling between 20–80° C.

4. The electrode according to claim 1, characterized in that the electrode is obtained in a continuous process.

5. The electrode according to claim 2, characterized in that the electrode is subjected to a homogenization heat treatment.

6. The electrode according to claim 1, wherein the lead-acid accumulator battery is a sealed lead-acid accumulator battery.

7. The electrode according to claim 6, characterized in that the electrode is used at temperatures cycling between 20–80° C.

8. The electrode according to claim 1, wherein the lead-acid accumulator battery is an unsealed lead-acid accumulator battery.

9. The electrode according to claim 1, wherein, in the lead alloy, from 1.2 to 2% of antimony is present.

10. The electrode of claim 1, wherein the electrode is a positive electrode.

* * * * *